April 30, 1963

O. J. H. WULF 3,087,253

HEAT EXCHANGE METHOD AND APPARATUS

Filed July 7, 1959

INVENTOR.
OTTO J. H. WULF
BY Pennie Edmonds
Morton Barrows & Taylor
Attys

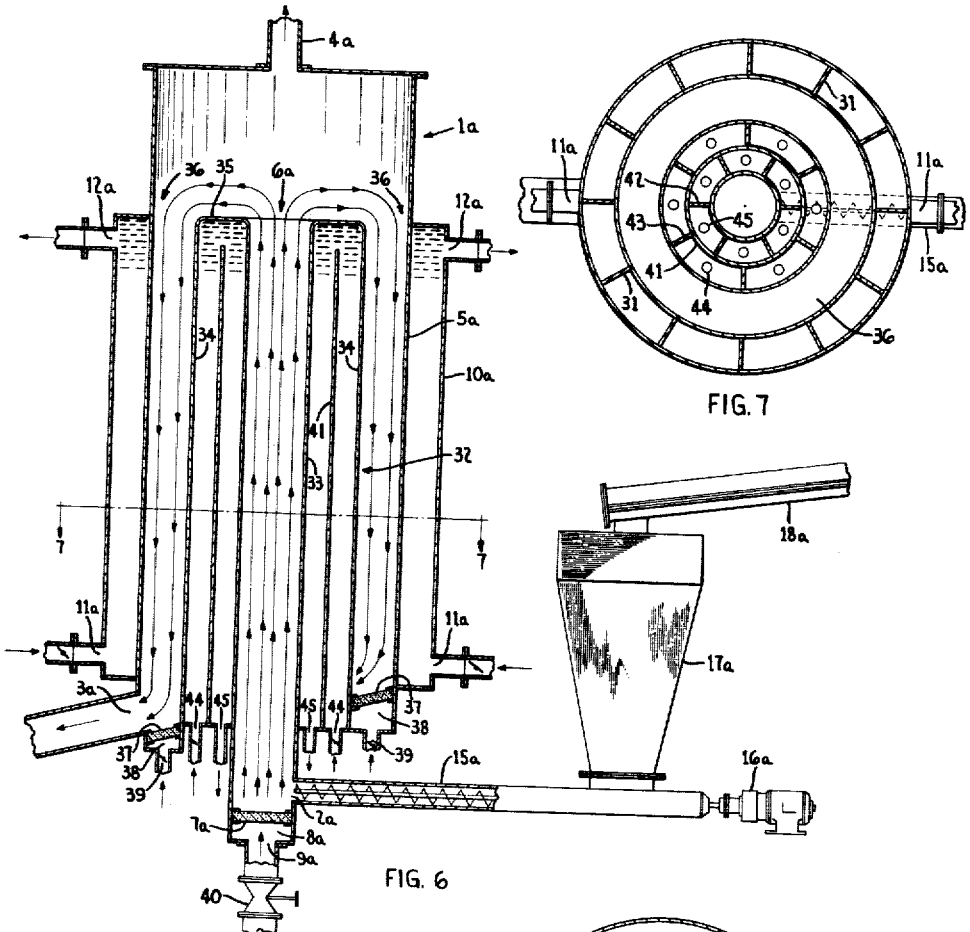

April 30, 1963  O. J. H. WULF  3,087,253
HEAT EXCHANGE METHOD AND APPARATUS
Filed July 7, 1959  3 Sheets-Sheet 3

INVENTOR.
OTTO J.H. WULF

United States Patent Office 3,087,253
Patented Apr. 30, 1963

3,087,253
HEAT EXCHANGE METHOD AND APPARATUS
Otto J. H. Wulf, Hamburg, Germany, assignor to Fuller Company, a corporation of Delaware
Filed July 7, 1959, Ser. No. 825,446
Claims priority, application Germany July 11, 1958
10 Claims. (Cl. 34—10)

The present invention relates to heat exchange for altering the temperature of pulverulent or granular material, and is more particularly concerned with the cooling of such material in fluidized beds.

Prior attempts at cooling pulverulent or granular materials, such as alumina or cement, have included water cooled and water jacketed screw conveyors and water cooled vessels in which the material to be cooled is mechanically moved along the cooled surface of the vessel. More recently, it has been proposed to cool such material in a fluidized bed in which are embedded water cooled pipes or other heat transfer members. However, these expedients have not been entirely satisfactory.

Mechanical coolers such as the cooled screw conveyors and cooled vessels consume large amounts of water and power and are highly susceptible to abrasion, particularly with materials such as cement. While the more recent fluidizing coolers are a substantial improvement over the mechanical devices, they are subject to difficulties such as non-uniform aeration of the fluidized beds and short-circuiting of material through the bed and around the heat transfer surfaces.

The present invention provides for the cooling of pulverulent or granular materials in one or more fluidized beds of relatively small cross-sectional area, in which each bed is surrounded by heat transfer surfaces which define substantially unobstructed, upright shafts through which the material passes.

In general, the preferred form of apparatus of the present invention comprises a vessel having a material inlet, a gas outlet and a material outlet. A gas-permeable deck is provided in the lower region of the vessel and an underlying plenum chamber receives a gas under pressure which passes upwardly through the gas-permeable deck. The gas passing upwardly through the deck fluidizes the overlying material and is discharged from the vessel through the gas outlet.

A jacket cooled by water or other suitable means defines at least one substantially unobstructed, upright shaft of the fluidized material through which the material passes en route from the material inlet to the material outlet. The material may be passed either upwardly or downwardly through the shaft. Where more than one shaft is provided, the material may pass in alternate directions in successive shafts and may be aerated to different degrees in successive shafts.

A better understanding of the invention may be derived from the accompanying drawings and description in which:

FIG. 6 is a sectional view of a modified form of cooler;

FIG. 7 is a sectional view on lines 7—7 of FIG. 6;

FIG. 8 is a view similar to FIG. 7 showing a modified form of water jacketing;

FIG. 9 is a view similar to FIG. 7 showing a further modified form of water jacketing;

Figure 1:
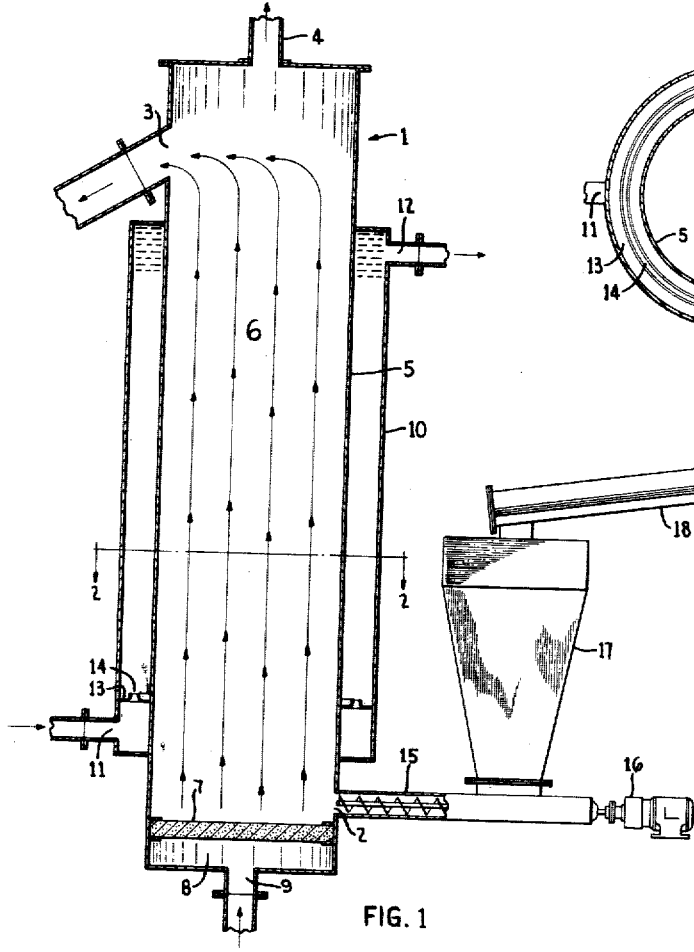
FIG. 1 is a sectional view of a material cooler according to the invention.
Figure 2:
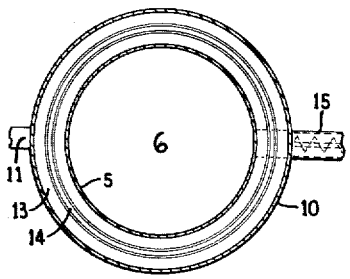
FIG. 2 is a sectional view on lines 2—2 of FIG. 1.

As shown in FIGS. 1 and 2, the cooler comprises a substantially upright vessel 1 of small cross-sectional area relative to its length and having a material inlet 2 in its lower region, a material outlet 3 and a gas outlet 4, both in its upper region. The vessel comprises a cylindrical heat transfer wall 5 forming a relatively narrow material shaft 6, intermediate the inlet 2 and outlet 3, which is unobstructed throughout its length and extends substantially vertically.

A gas-permeable deck 7 is positioned beneath the material shaft 6 and above a plenum chamber 8. A suitable source of gas under pressure, not shown, is provided for passing a gas into the plenum chamber 8 through an inlet 9 and upwardly through the plenum chamber 8, gas-permeable deck 7, the material in the shaft 6 and then out through vent or gas outlet 4.

A cooling water jacket 10 surrounds the vessel wall 5 and has an inlet 11 and an outlet 12 at opposite vertical ends thereof. An internal, annular wall 13 in the water jacket has an annular orifice 14 therein and is positioned intermediate the inlet 11 and outlet 12 and close to the inlet 11 to enforce a uniform flow of water about the jacket.

A screw conveyor 15 driven by a motor 16 delivers material through the material inlet 2 from a hopper 17 fed by a conveyor 18 or other suitable means.

In operation of the apparatus of FIGS. 1 and 2, the screw conveyor 15 is started and the flow of gas through the gas-permeable deck is established. The gas flowing upwardly through the deck 7 fluidizes the overlying column of pulverulent material in the material shaft 6, and escapes the vessel through the outlet 4. Preferably, the gas outlet 4 is of sufficient capacity to prevent a build-up of pressure in the vessel above the fluidized material column to facilitate proper fluidization and to reduce any tendency toward condensation of moisture from the air.

When the material shaft 6 has been filled with material to a substantial height, a suitable flow of water is established through the water jacket inlet 11, the orifice 14, the water jacket itself and the outlet 12. The water cools the heat-transfer surface or wall 5 of the vessel, thereby maintaining a temperature differential between the heat-transfer wall 5 and the aerated or fluidized column of material in the material shaft 6 and causing a transfer of heat from the material to the heat transfer wall 5.

The unobstructed material shaft permits the fluidizing gas to pass upwardly through the column of material without interference from transverse pipes or coils which otherwise would form a tortuous path for the gases and interfere with uniform fluidization of the material. Therefore, the material is uniformly fluidized, within the limits of its physical properties, without local zones of static material or zones of extremely loose material which might otherwise cause variations in cooling efficiency, coating of the cooling surfaces or short-circuiting of new material through the material mass to the outlet.

The relatively small cross-sectional area of the fluidized material column and the tendency of the column toward uniformity of temperature, which is characteristic of uniformly fluidized beds, both serve to provide effective transfer of heat from the material and through the heat transfer wall 5 to the water flowing through the cooling jacket.

Figures 3, 4, 5:
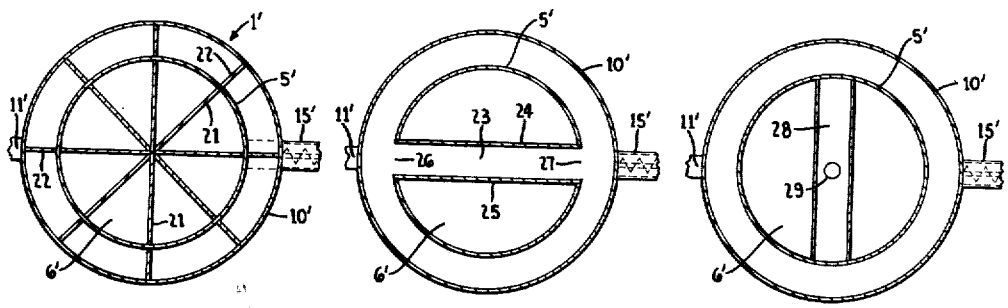
FIG. 3 is a view similar to FIG. 2 showing a modified form of heat transfer surface.
FIG. 4 is a view similar to FIG. 2 showing a modified form of water jacketing.
FIG. 5 is a view similar to FIG. 2 showing a further modified form of water jacketing.

Modified forms of heat transfer surfaces and cooling jackets are shown in FIGS. 3, 4 and 5, in which similar numerals, primed, denote elements similar to those of FIGS. 1 and 2.

As shown in FIG. 3, a plurality of radial heat transfer walls 21 and 22 are extended from the heat transfer wall 5' into the material shaft 6' and into the water jacket 10', respectively. The heat transfer walls 21 and 22 extend a substantial height of the vessel but are spaced from the bottom and top of the material shaft 6 and the cooling jacket to permit flow of material and water, respectively, therearound.

The operation of the cooler of FIG. 3 is similar to that of FIGS. 1 and 2, except that heat is additionally conducted through the walls 21 and 22 to the water in the jacket.

As shown in FIG. 4, a transverse water cooled partition or conduit 23 extends across the material shaft 6'. The conduit 23 comprises a pair of spaced-apart heat-transfer walls 24 and 25, and is open at its ends to the cooling jacket 10' through openings 26 and 27 in the wall 5'. As shown in FIG. 5, a transverse conduit 28 which is generally similar to the conduit 23 of FIG. 4 is provided in the material shaft 6' but is not open to the cooling jacket 10. The transverse conduit is spaced at its bottom from the gas-permeable deck to permit material flow therebeneath, and may receive its water supply through a separate inlet 29. The water after passing through transverse conduit will be discharged through a separate discharge conduit. The operation of the coolers of FIGS. 4 and 5 is similar to that of FIGS. 1 and 2, except that the cross-sectional area of the individual material shafts is substantially reduced, thereby reducing the maximum distance between any portion of the material column and the closest cooled heat transfer surface.

Where higher cooling rates or material throughput capacities are desired, or where desired for any reason, the form of the invention shown in FIGS. 6 and 7 may be employed. In these figures, the same numerals, suffixed a, are used to denote structure similar to that of FIG. 1.

The peripheral water jacket 10a is provided with a plurality of inlets 11a, outlets 12a and radial walls 31 to provide for controlled distribution and guidance of the water-flow therein. The radial walls 31 terminate short of the ends of the cooling jacket 10a to permit water flow therearound both from and to the inlets and outlets, respectively. Where desired, the radial walls may close with the ends of the cooling jacket, and individual inlets and outlets may serve the spaces between adjacent radial walls.

An internal cooling jacket 32 comprising an annular vessel formed by spaced, concentric cylindrical walls 33 and 34 and an annular top wall 35 closing the space therebetween is positioned within the vessel 1a. The internal cooling jacket forms the material shaft 6a therein and with the heat transfer wall 5a forms an annular material shaft 36 surrounding and concentric with the shaft 6a.

A sloping gas-permeable deck 37 closes the lower end of the outer material shaft 36 and slopes downwardly toward the material outlet 3a which, in this embodiment, is located in the lower region of the vessel. A plenum chamber 38 underlies the gas-permeable deck 37 and receives a supply of gas through an inlet 39.

The relative rates of gas supply to the plenum chambers 8a and 38 are controlled by suitable valves such as the valve 40 shown associated with the gas inlet 9a and plenum chamber 8a.

The interior of the closing jacket 32 is subdivided by a circular wall 41 and a plurality of inner radial walls 42 and outer radial walls 43. The zones between the cylindrical wall 34, adjacent radial walls 43, and the circular wall 41 each receive cooling water from one of a plurality of inlets 44 in the lower region of the internal jackets. Similarly, a plurality of outlets 45 drain water from the spaces between the circular wall 41, adjacent radial walls 42 and the cylindrical wall 33. The flow of water through the inner jacket may be reversed, if desired, from the direction shown. The circular wall 41 terminates short of the annular top wall 35 to permit the cooling water to flow thereover from the inlets 44 to the outlets 45.

In operation of the cooler of FIGS. 6 and 7, the screw conveyor 15a is started and the flow of gas through the gas-permeable decks 7a and 37 is established. The gas flowing upwardly through the deck 7a fluidizes the overlying column of material in the inner material shaft 6a.

When the inner material shaft 6a has been filled with material, the material spills over into the outer, annular shaft 36. Normally, the equipment to which material is delivered through the outlet 3a, such as a conveying device, will prevent uncontrolled draining of material from the annular shaft 36, and therefore will permit a bed of material to be established in this outer shaft. Where this is not the case, a suitable valve or other restricting means may be provided in the discharge pipe for that purpose.

The head of material in the annular shaft 36 is fluidized by the gas passing upwardly through the gas-permeable deck 37.

When the inner and outer material shafts 6a and 36 have been substantially filled with columns of fluidized material, a flow of cooling water is established through the inlets 11a, 44 and outlets 12a, 45 of the outer and inner cooling jackets 10a and 32, respectively. The water flowing through the cooling jackets maintains a temperature differential between the heat transfer wall 5, the cylindrical walls 33 and 34, and the fluidized material columns respectively adjacent thereto, thereby causing a transfer of heat from the material to the adjacent cooled walls.

It has been found particularly advantageous to maintain the column of material in the shaft 6a more highly aerated than the material in the annular shaft 36. This may be obtained by a proper control of the amount of gas introduced into the plenum chambers 9a and 37. The increased agitation resulting from this greater aeration, as well as proper control of the water flow through the inner cooling jacket, which control depends on the variables of the inlet temperatures of both the material and the water, facilitates the initial chilling or quick-cooling of the material received into the material shaft 6a.

As is the case with the cooler of FIGS. 1 and 2, the unobstructed material shafts permit uniform fluidization of the columns of material therein without local zones of static or loose material which would cause short-circuiting, coating of material on the walls, or otherwise interfere with proper cooling.

Modified forms of the cooling jackets of FIGS. 6 and 7 are shown in FIGS. 8 and 9, in which similar numerals, primed, are used to denote elements similar to those of FIGS. 6 and 7.

As shown in FIG. 8, a plurality of water cooled partitions or conduits 47 extend radially across the annular shaft 36'. The conduits each comprise a pair of walls 48 and 49 terminating short of the gas-permeable deck to permit material flow therebeneath and are provided with suitable water inlets 50. The conduits 47 are uniformly spaced from each other and subdivide the annular shaft 36' into a plurality of outer shafts 51 which are of very small cross-sectional area. The outer shafts 51 are in open communication with each other at their lower ends, adjacent the gas-permeable deck 37', as well as at the top of the vessel.

The operation of the cooler of FIG. 8 is similar to that of FIGS. 6 and 7 except that the material in the outer shafts 51 is in contact with large areas of very closely controlled and closely spaced cooling surfaces, after the material has been initially chilled in the highly aerated inner shaft 6'a.

As shown in FIG. 9, a plurality of radial cooling conduits 53 subdivide the annular shaft 36' into a plurality of outer shafts 56, similar to the conduits 47 and outer shafts 51 of FIG. 8. However, the conduits 53 are supplied with water directly from the inner and outer water jackets through openings 54 and 55 at opposite ends thereof.

The operation of the cooler of FIG. 9 is generally similar to that of FIG. 8.

Figure 10:
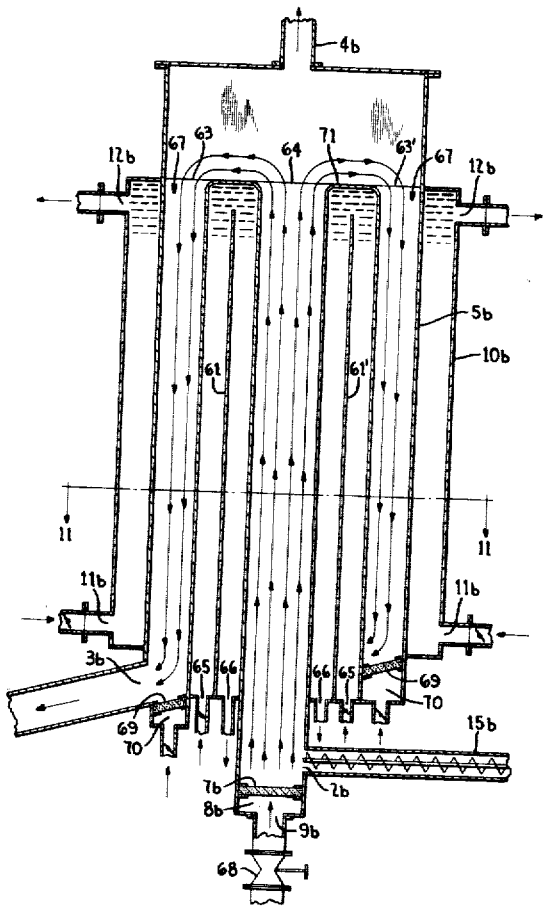
FIG. 10 is a sectional view of a modified form of the invention.
Figure 11:
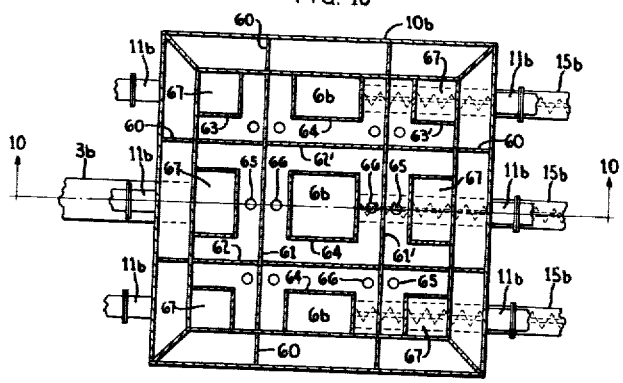
FIG. 11 is a sectional view on lines 11—11 of FIG. 10.

A modified form of cooler is shown in FIGS. 10 and 11, in which similar numerals, suffixed b, are used to denote structures similar to that of FIG. 1. As shown in these figures, the vessel 1b is rectangular in cross section, as is the peripheral cooling jacket 10b. The cooling jacket 10b is compartmented by a plurality of dividing walls 60 and served by a plurality of inlets 11b and outlets 12b.

The interior of the vessel is subdivided by a pair of spaced, transverse walls 61, 61' and a pair of spaced, intersecting walls 62, 62' meeting the transverse walls at right angles. A plurality of partially rectangular heat transfer walls 63, 63' extend upwardly between the heat transfer wall 5b and the transverse walls 61 and 61', respectively, and form with the wall 5b a plurality of outer material shafts 67 having underlying gas-permeable decks 69 and plenum chambers 70.

A plurality of at least partially rectangular heat transfer walls 64 extend upwardly in the spaces formed by the intersecting walls 62, 62' between the transverse walls 61, 61' and at least partially define three inner material shafts 6b. As illustrated, the inner material shafts 6b are arranged above individual gas-permeable decks 7b. Each of the gas-permeable decks overlies a plenum chamber 8b to which gas is supplied through a gas supply pipe under the control of a valve 68. Material is supplied to each of the shafts 6b by individual screw conveyors 15b. However, where desired, a common gas-permeable deck, plenum chamber, gas supply and material supply may be used.

The cooling jackets formed by the heat transfer walls 63, 63' are each provided with a pair of water inlets 65 in their lower regions and those formed by the walls 64 are provided with water outlets 66 in their lower regions. The heat transfer walls 63, 63', 64 extend upwardly above the transverse walls 61, 61' and intersecting walls 62, 62' to permit water from the inlets to flow upwardly and over the top of those members and then downwardly to the outlet 66. At convenient points in their lower ends, portions of the inner cooling jackets terminate short of the gas-permeable deck 69 to permit transfer of material from the lower regions of the outer material shafts adjacent the transverse wall 61' and over to the corresponding outer shaft adjacent the transverse wall 61 and therefrom to the outlet 3b.

The operation of the cooler of FIGS. 10 and 11 is similar to that of FIGS. 6 and 7, with the hot material being initially chilled in the highly aerated inner material shafts 6b, spilled over to the less highly aerated outer shafts 67, and completely cooled in the outer shafts prior to discharge through the outlet 3b.

Various changes may be made in the details of the cooler of the present invention as disclosed without sacrificing the advantages thereof or departing from the scope of the accompanying claims.

I claim:

1. A cooler for pulverulent or granular material comprising a vessel, means forming a first cooling jacket about a portion of the periphery of the vessel, a second cooling jacket within the vessel, said second cooling jacket at least partially forming an elongated first material shaft, said first and second cooling jackets at least partially forming therebetween an elongated second material shaft, said material shafts being substantially unobstructed and extending upwardly in the vessel, means providing communication between the upper ends of said shafts, a gas-permeable deck underlying each material shaft, means for passing a gas upwardly through each gas-permeable deck to fluidize overlying material, means for introducing material into the lower end of the first material shaft to flow upwardly therein and to flow therefrom into the upper region of the second material shaft, means for discharging gas from the upper portion of the vessel, means for withdrawing cooled material from the second material shaft, and means for passing a coolant through the cooling jackets to maintain a temperature differential between each cooling jacket and the material in the shafts.

2. Apparatus according to claim 1 including means for causing a different rate of gas flow per unit area to pass through the gas-permeable deck underlying one of the material shafts than is passed through the other deck.

3. Apparatus according to claim 1 in which one of said material shafts is positioned inwardly of the other material shaft.

4. Apparatus according to claim 1 in which the second material shaft surrounds the first material shaft.

5. A cooler for pulverulent or granular material comprising a vessel including a plurality of cooling jackets each having a fluid inlet and a fluid outlet, said cooling jackets forming at least in part a plurality of material shafts of small cross-sectional area in relation to their lengths, said material shafts being substantially unobstructed throughout their lengths extending upwardly in the vessel and communicating at their upper ends, a gas-permeable deck underlying each material shaft, means for passing a gas upwardly through each gas-permeable deck to fluidize overlying material, said material shafts being arranged as an inner shaft group and an outer shaft group, means for introducing a material in the lower ends of the shafts of one of the shaft groups to pass upwardly therein and over into the shafts of the other shaft group, means for discharging gas from the upper portion of the vessel, control means for passing a coolant through the cooling jackets to maintain different temperature differentials between the respective inner and outer shaft groups and the material therein, and means for withdrawing cooled material from the shafts of the other shaft group.

6. Apparatus according to claim 5 including means for causing a greater rate of gas flow per unit area to pass through the gas-permeable deck area underlying the shafts of the group to which material initially is fed than is passed through the gas-permeable deck underlying the outer shaft group.

7. Heat transfer apparatus for pulverulent or granular material comprising an upright vessel, a heat transfer surface forming at least in part a plurality of substantially unobstructed, upwardly-extending material shafts, gas-permeable decks in the lower region of the vessel and underlying the respective material shafts, means for passing a gas upwardly through the gas-permeable decks to fluidize overlying material, means for introducing material to one of said material shafts, means for discharging material from another of said material shafts, means for transferring material between successive shafts to cause material to flow through said shafts in series, means for discharging gas from the upper portion of the vessel, means for maintaining a temperature differential between the heat transfer surface and the material within the respective shafts, including a fluid jacket, and control means for maintaining different temperature differentials between areas of the fluid jacket and the material in the respective shafts adjacent thereto.

8. The method of cooling pulverulent or granular materials which comprises establishing first and second separated aerated columns of material, introducing material into an end portion of the first column to pass therethrough, transferring material from the end portion of the first column remote from the material-feed end to one end thereof of the second column, circulating a heat-exchange medium in indirect heat exchange with the material in the aerated columns to withdraw heat from the material, correlating the rate of circulation of the heat-exchange medium with the degree of aeration of the material in the respective columns to effect initial chilling or quick cooling of the material in said first column, and withdrawing cooled material from the second aerated column.

9. The method of claim 8 in which the material is introduced into the lower end of the first aerated column.

10. The method of claim 8 in which a higher aeration of the material is maintained in the first column than is maintained in the second column.

References Cited in the file of this patent

UNITED STATES PATENTS

| | | |
|---|---|---|
| 2,356,778 | Morris | Aug. 29, 1944 |
| 2,761,668 | Sylvest | Sept. 4, 1956 |
| 2,777,760 | Dinnen et al. | Jan. 15, 1957 |
| 2,841,476 | Dalton | July 1, 1958 |
| 2,891,320 | Buff | June 23, 1959 |
| 2,954,643 | Porter et al. | Oct. 4, 1960 |

FOREIGN PATENTS

| | | |
|---|---|---|
| 739,372 | Great Britain | Oct. 26, 1955 |

UNITED STATES PATENT OFFICE
CERTIFICATE OF CORRECTION

Patent No. 3,087,253  April 30, 1963

Otto J. H. Wulf

It is hereby certified that error appears in the above numbered patent requiring correction and that the said Letters Patent should read as corrected below.

Column 4, line 5, for "closing" read -- cooling --; column 6, line 57, for "outer" read -- other --; column 7, line 8, after "end" insert -- thereof --; line 9, strike out "therefor".

Signed and sealed this 26th day of November 1963.

(SEAL)
Attest:
ERNEST W. SWIDER

Attesting Officer

EDWIN L REYNOLDS

Acting Commissioner of Patents